United States Patent
Park

(10) Patent No.: US 7,889,817 B2
(45) Date of Patent: Feb. 15, 2011

(54) APPARATUS AND METHOD FOR RECEIVING A RADIO SIGNAL

(75) Inventor: Hyung-Chul Park, Daejeon (KR)

(73) Assignee: PHYCHIPS Inc. (KR)

( * ) Notice: Subject to any disclaimer, the term of this patent is extended or adjusted under 35 U.S.C. 154(b) by 259 days.

(21) Appl. No.: 12/301,873

(22) PCT Filed: Jun. 3, 2008

(86) PCT No.: PCT/IB2008/052149

§ 371 (c)(1),
(2), (4) Date: Nov. 21, 2008

(87) PCT Pub. No.: WO2008/149280

PCT Pub. Date: Dec. 11, 2008

(65) Prior Publication Data

US 2010/0246724 A1    Sep. 30, 2010

(30) Foreign Application Priority Data

Jun. 4, 2007    (KR) .................. 10-2007-0054297

(51) Int. Cl.
*H04L 27/06* (2006.01)
(52) U.S. Cl. ..................... 375/340; 375/150
(58) Field of Classification Search ............... 375/340, 375/150, 152, 316, 368, 342, 343
See application file for complete search history.

(56) References Cited

U.S. PATENT DOCUMENTS

2002/0048316 A1\* 4/2002 Imaizumi et al. ............ 375/150
2004/0125901 A1\* 7/2004 Nakahara et al. ............ 375/368
2005/0070237 A1\* 3/2005 Moriai et al. ............ 455/151.1
2007/0241904 A1\* 10/2007 Ozaki et al. ............ 340/572.1

FOREIGN PATENT DOCUMENTS

JP    2006-211211    8/2006

\* cited by examiner

*Primary Examiner*—Chieh M Fan
*Assistant Examiner*—Aristocratis Fotakis
(74) *Attorney, Agent, or Firm*—The Belles Group, P.C.

(57) ABSTRACT

The present invention relates to a radio frequency signal receiver, and more particularly, to a radio frequency signal receiver of a communication system, in which local devices exchange a radio frequency signal with each other. The object of the present invention is to provide a radio frequency signal receiver that exactly restores data from a received signal without a complex circuit restoring a phase of a received signal. It is another object of the present invention to provide a radio frequency signal receiver that eliminates noise when the noise is included in the received signal, estimates an exact data rate of the received signal, and exactly restores received information based on the estimated data rate thereof.

The radio frequency signal receiver includes: a phase converting unit converting a phase of a received digital signal to predetermined angles to produce a plurality of output signals having different phases; and decoding units decoding the plurality of output signals from the phase converting unit, respectively.

According to the present invention, data may be restored from a received signal without a complex circuit restoring a phase of a received signal. Moreover, when noise is included in the received signal, the noise is eliminated, an exact data rate of the received signal is estimated, and received information may be exactly restored.

19 Claims, 10 Drawing Sheets

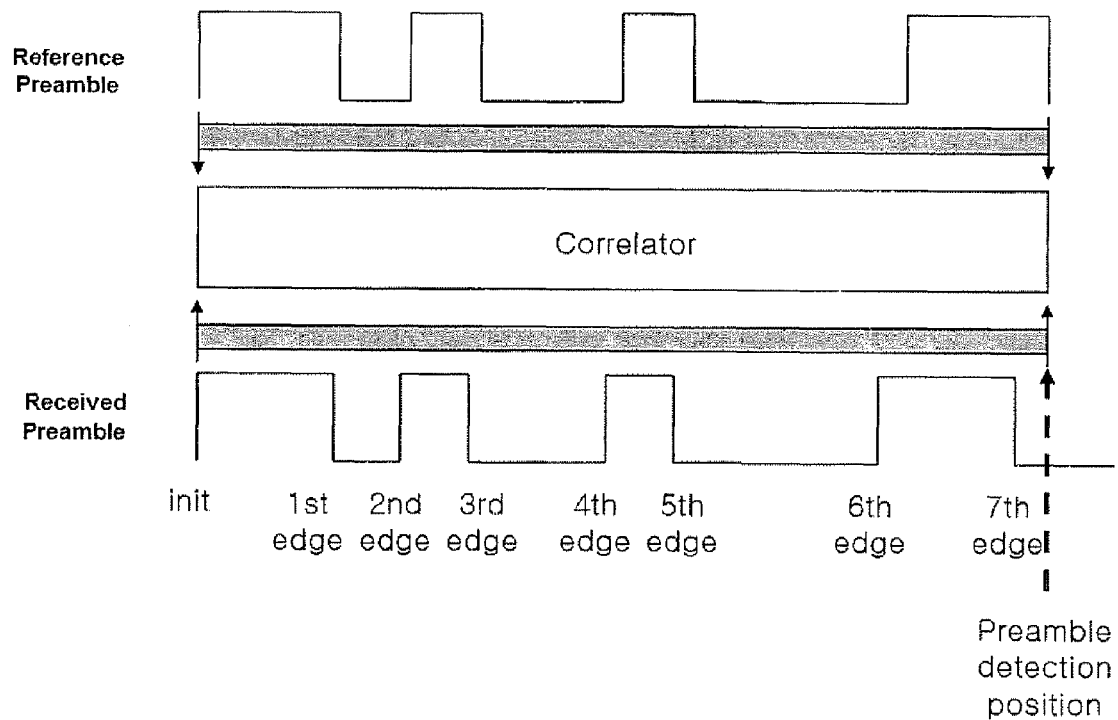

APPARATUS AND METHOD FOR RECEIVING A RADIO SIGNAL

CROSS-REFERENCE TO RELATED PATENT APPLICATIONS

The present application is a U.S. national stage entry of PCT/IB2008/052149 under 37 U.S.C. §371, filed Jun. 3, 2008, which claims priority to Korean Patent Application No. 10-2007-0054297, filed Jun. 4, 2007, the entire disclosures of which are hereby incorporated by reference.

TECHNICAL FIELD

The present invention relates to a radio frequency signal receiver, and more particularly, to a radio frequency signal receiver of a communication system, in which local devices exchange a radio frequency signal with each other.

BACKGROUND ART

There is a radio frequency identification (RFID) system as an example of a communication system in which local devices exchange a radio frequency signal with each other. RFID is a technique that automatically recognizes data stored in a tag, a label, or a card mounting a micro chip therein. In an RFID system, tags are attached to products or objects to be managed, identification information of the objects and ambient environmental information are recognized to collect, store, process, and track information for respective objects, so that various services such as positioning, remote processing, and management for the objects, and information exchange therebetween may be provided. The RFID may simultaneously recognize a plurality of tags in a non-contact manner, store large capacity data, and be semi-permanently used, and a recognition time thereof is short. Accordingly, the RFID is attracting attention as a main technology for the next generation for solving the problems of a conventional barcode or a magnetic recognition device and improving convenience of use.

An RFID system includes a tag, a reader, and a server (middleware and application service platform), and is used to operatively cooperate with a wire/wireless communication network. The tag has information capable of recognizing objects and is positioned on the objects. The reader collects and processes information regarding the objects, and has a communication function transmitting the information to the server. The server performs application processing using the information regarding the objects.

RFID reader transmits power and a command to the tag as a carrier signal, receives a response from the tag, and restores the signal. In this case, the power enables a passive tag to be operated. The RFID reader includes an RF analog unit and a digital signal processing control unit. The RF analog unit includes a power amplifier and a frequency up-mixer transferring power and data to an antenna, a low noise amplifier and an analog signal processor restoring a response signal received by the antenna from the tag. The digital signal processing control unit includes an encoder, a decoder, a clock generation circuit, a memory, a processor, and a host interface device.

In order to revitalize the market of RFID, it is necessary to reduce the cost of the tag and the reader. In a receiver of the reader, since a circuit compensating for a phase of a tag signal is complicated, it becomes an obstacle in a cost reduction of the reader. Moreover, when the noise is included in the tag signal, it is difficult to exactly decode the data. A transmission speed of the tag signal is different from an expected speed, it is difficult to exactly decode the data.

DISCLOSURE OF INVENTION

Technical Problem

The present invention has been made in view of the above problems, and provides a radio frequency signal receiver that exactly restores data from a received signal without a complex circuit for restoring a phase of a received signal. It is another object of the present invention to provide a radio frequency signal receiver that eliminates noise when the noise is included in the received signal, estimates an exact data rate of the received signal, and exactly restores received information based on the estimated data rate thereof.

Technical Solution

In order to achive the objects, there is provided a radio frequency signal receiver comprising: a phase converting unit converting a phase of a received digital signal to predetermined angles to produce a plurality of output signals having different phases; decoding units decoding the plurality of output signals from the phase converting unit, respectively; and a data selecting unit selecting and outputting one of the decoded output signals, wherein the decoding unit includes: a limiter outputting a binary signal according to a sign (negative or positive) of a corresponding output signal of the phase converting unit; a preamble detector detecting whether the corresponding output signal of the phase converting unit is a preamble signal; and a data detector detecting data based on the binary signal in response to the detection result of the preamble detector.

Preferably, the radio frequency signal receiver further comprises a radio frequency receiving unit receiving a radio frequency signal and down-converting a frequency of the radio frequency signal; and an analog-to-digital converting unit converting the frequency down-converted signal into a digital signal and providing the digital signal to the phase converting unit.

Preferably, the radio frequency receiving unit outputs an in-phase channel signal and a quadrature-phase channel signal, the analog-to-digital converting unit includes: a first ADC (analog-to-digital converter) converting the in-phase channel signal into a digital signal; and a second ADC converting the quadrature-phase channel signal into the digital signal.

Preferably, the received digital signal includes an in-phase channel signal and a quadrature-phase channel signal, the phase converting unit produces the plurality of output signals having different phases using the in-phase channel signal and the quadrature-phase channel signal.

Preferably, the data detector includes: first correlator performing correlation of the binary signal and a first reference signal, and second correlator performing correlation of the binary signal and a second reference signal; and a bit data determining unit determining bit data based on the signal correlation results of the first and second correlators.

Preferably, the decoding unit further includes a noise eliminator eliminating a noise included in the binary signal, and the noise eliminator eliminates a pulse of the binary signal when a width $T_{short-pulse}$ of the pulse is less than a predetermined threshold value.

Preferably, the decoding unit further includes a data rate estimator estimating a data rate of the received digital signal based on the preamble signal, and the data detector detects the data based on the estimated data rate of the received digital signal.

Preferably, the decoding unit further includes a data rate correcting unit correcting the estimated data rate of the received digital signal.

Preferably, the data selecting unit selects a signal having a most exact cyclic redundancy checking (CRC) code among the decoded signals.

Preferably, the data selecting unit selects and outputs one among the decoded signals from the decoding unit according to the detection result of the preamble detector.

According to another aspect of the present invention, there is a method of receiving a radio frequency signal comprising: converting a phase of a received digital signal to predetermined angles to produce a plurality of output signals having different phases; decoding the plurality of output signals, respectively; and selecting one of the decoded output signals, decoding the plurality of output signals includes: producing a binary signal according to a sign of the output signal; detecting whether the output signal is a preamble signal; and detecting data from the binary signal.

Preferably, the received digital signal includes an in-phase channel signal and a quadrature-phase channel signal, producing the plurality of output signals produces the plurality of output signals having different phases using the in-phase channel signal and the quadrature-phase channel signal.

Preferably, detecting the data includes: performing correlation of the binary signal and a first reference signal, and correlation of the binary signal and a second reference signal, respectively; and determining bit data based on the signal correlation results.

Preferably, decoding the plurality of output signals, eliminates a pulse of the binary signal when a width $T_{short-pulse}$ of the pulse is less than a predetermined threshold value.

Preferably, decoding the plurality of output signals further includes estimating a data rate of the received digital signal based on the preamble signal, and detecting the data includes detecting the data based on the estimated data rate of the received digital signal.

Preferably, decoding the plurality of output signals further includes correcting the estimated data rate of the received digital signal.

Preferably, selecting the one of the decoded output signals includes selecting a signal having a most exact cyclic redundancy checking (CRC) code among the decoded signals.

Preferably, selecting the one of the decoded output signals includes selecting one among the decoded signals according to the detection result.

Preferably, a computer readable recording medium may store a computer program for executing the radio frequency signal receiving method.

Advantageous Effect

According to the present invention, data may be restored from a received signal without a complex circuit restoring a phase of a received signal. Moreover, when noise is included in the received signal, the noise is eliminated, an exact data rate of the received signal is estimated, and received information may be exactly restored.

DETAILED DESCRIPTION

Hereinafter, the present invention will be described in detail with reference to accompanying drawings. The same reference symbols are used throughout the drawings to refer to the same or like parts.

Figure 1:
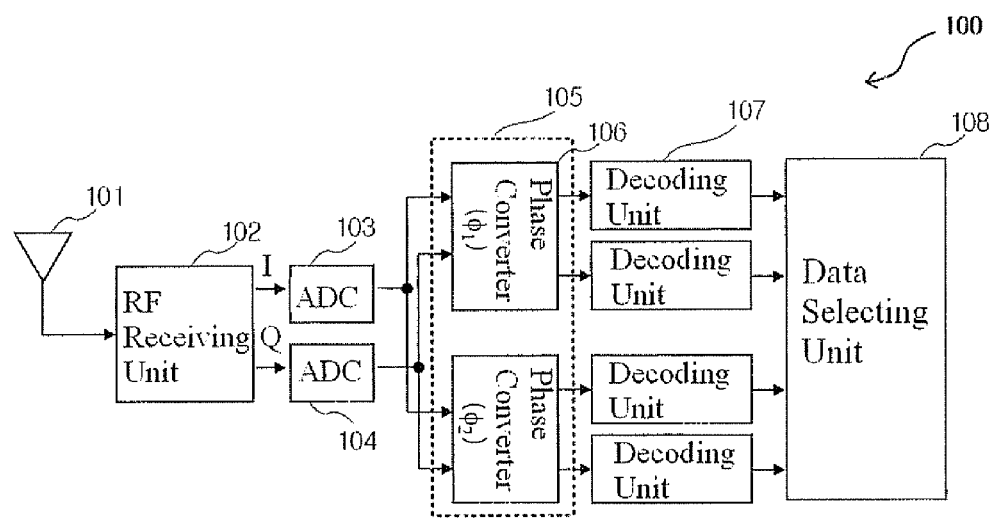
FIG. 1 is a block diagram illustrating a configuration of a radio frequency signal receiver according to an embodiment of the present invention.

FIG. 1 is a block diagram illustrating a configuration of a radio frequency signal receiver 100 according to an embodiment of the present invention. Referring to FIG. 1, the radio frequency signal receiver includes a phase converting unit 105, decoding units 107, and a data selecting unit 108. The phase converting unit 105 rotates a phase of a received digital signal to predetermined angles to produce a plurality of output signals having different phases. The decoding units 107 decode the plurality of output signals from the phase converting unit 105, respectively. The data selecting unit 108 selects and outputs one of the decoded data sequences from the decoding units 107. Preferably, the radio frequency signal 100 receiver may include an antenna 101 receiving a radio frequency (RF) signal, an RF receiving unit 102 receiving an RF signal and down-converting a frequency of the RF signal; and first and second ADCs 103 and 104 converting the frequency down-converted signal into a digital signal and providing the digital signal to the phase converting unit 105.

The RF receiving unit 102 functions to down-convert a frequency of the signal received by the antenna 101. Although not shown, the RF receiving unit 102 may include a low-noise amplifier, a mixer, and amplifier. The RF receiving unit 102 down-converts a frequency of the RF signal to output an in-phase channel signal and a quadrature-phase channel signal.

The in-phase channel signal and the quadrature-phase channel signal output from the RF receiving unit 102 are converted into first and second digital signals by the first and second ADCs 103 and 104, respectively. The first and second digital signals, that is, a digital in-phase channel signal and a digital quadrature-phase channel signal are provided to the phase converting unit 105.

The phase converting unit 105 produces the plurality of output signals having different phases using the in-phase channel signal and the quadrature-phase channel signal. In the present embodiment, the phase converting unit 105 includes two phase converters 106, which output four output signals of different phases.

Next, the plurality of outputs having different phases from the phase converting unit 105 are decoded by plurality of the decoding units 107 respectively. The same number of decoding units 107 is required as the corresponding number of outputs of the phase converting unit 105. Constructions of decoding units 107 are identical with each other.

Subsequently, the decoding units 107 provide the decoded data to the data selecting unit 108. The data selecting unit 108 selects and outputs one of the decoded data from the decoding units 107.

In general, a signal produced by a local oscillator and the received signal are different from each other in frequency and phase. In order to restore an exact signal, it is necessary to correct frequency error and phase error. After correction of the frequency error, error of some degree may generally remain. As a result, an adaptive tracking type phase compensation circuit is needed to exactly compensate for the phase. However, when a frequency in a local oscillator of a receiver is identical with that of a received carrier wave signal, a complex phase compensation circuit for phase compensation is not necessary. A sufficient performance of the receiver may be expected only by shifting the phase of received signal by a predetermined value, In the embodiment of the present invention, when the frequency of the local oscillator is identical with that of the carrier wave signal but the phases thereof are different from each other, a phase of a received signal is converted to a set value to produce a plurality of signals having different phases, the signals are respectively decoded, and one of the decoded signals is selected. Through the above-described operation, a complex phase restoring circuit is not required. As a result, the complexity of a circuit is reduced to improve cost competitive power of the receiver.

Hereinafter, a construction of the radio frequency signal receiver according to the embodiment of the present invention will be described in detail.

As described earlier, the phase converting unit 105 includes two phase converters 106. Although only two phase converters 106 are shown in FIG. 1, the number thereof is only an example and the present invention is not limited thereto. More than two phase converters are applicable. Further, although the phase converting unit 105 functions to produce a plurality of output signals having different phases, it is not limited to a construction including the phase converter 106.

Figure 2:
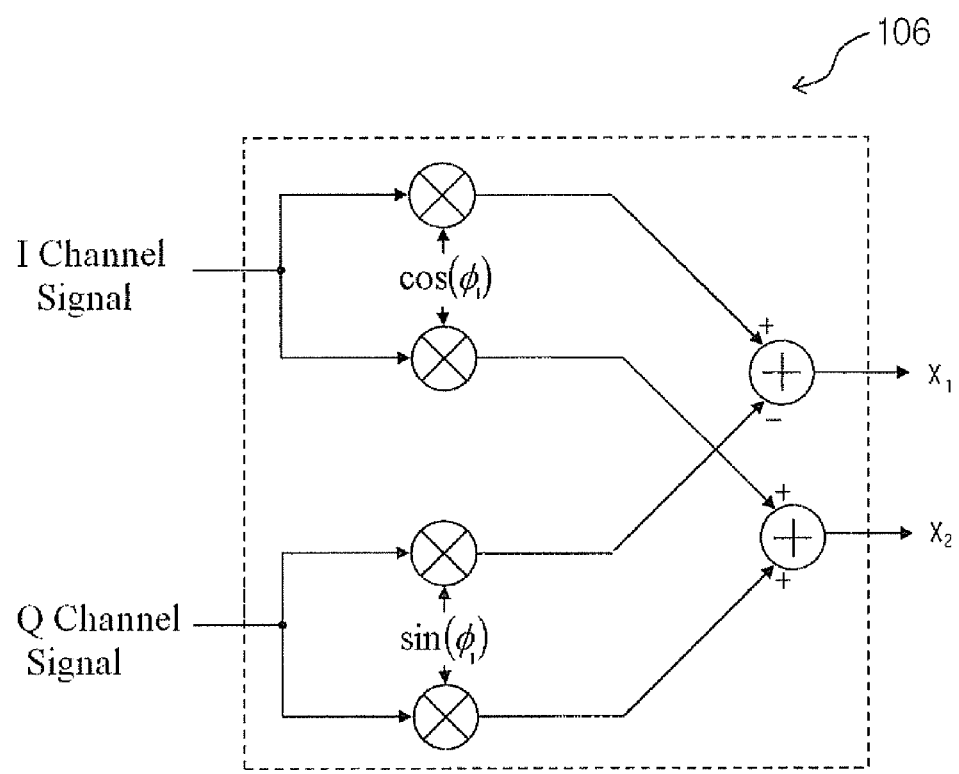
FIG. 2 is a view illustrating one example of a phase converter 106 according to the embodiment of the present invention.

FIG. 2 is a view illustrating one example of a phase converter 106 according to the embodiment of the present invention. With reference to FIG. 2, the phase converter 106 includes four multipliers and two adders. The phase converter 106 receives an in-phase channel signal and a quadrature-phase channel signal as input signals. For example, when the in-phase channel signal is cos(x) and the quadrature-phase channel signal is sin(y), a first output ($X_1$) and a second output ($X_2$) of the phase converter 106 are expressed by a following equation 1.

$$X_1 = \cos(x)\cos(\phi_1) - \cos(x)\sin(\phi_1) \cos(x+\phi_1)$$

$$X_2 = \sin(x)\cos(\phi_1) + \sin(x)\sin(\phi_1) = \cos(x-\phi_1) \quad \text{[Equation 1]}$$

That is, an output having a different phase by amount of $\pm\phi_1$ from a phase of an input signal is produced. When the two phase converters 106 are used, four output signals of different phases may be obtained. Namely, a phase of the input signal is converted to predetermined angles to obtain four output signals of different phases.

Figure 3:
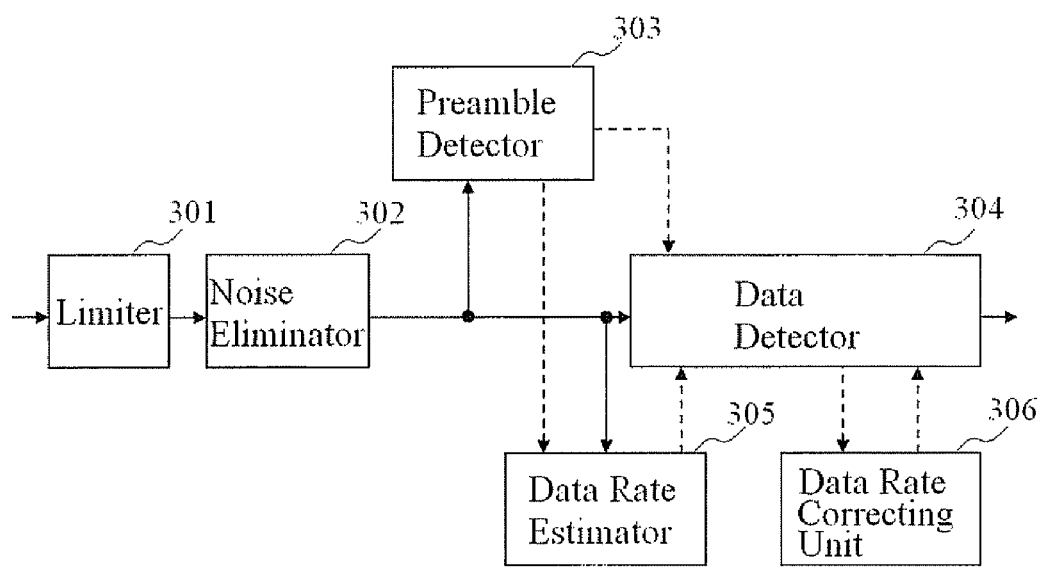
FIG. 3 is a view illustrating a configuration of a decoding unit 107 according to the embodiment of the present invention.

The following is a description of the decoding unit 107 according to the embodiment of the present invention. FIG. 3 is a view illustrating a configuration of the decoding unit 107 according to the embodiment of the present invention, and a data detector 304.

The decoding unit 107 includes a limiter 301, a preamble detector 303. Preferably, the decoding unit 107 may further include a noise eliminator 302, a data rate estimator 305, and a data rate correcting unit 306.

The limiter 301 outputs a binary signal according to whether a value of the received signal is less or greater than a set threshold value, namely a sign of the received signal. The output binary signal may be for example, a set of 1 and −1 or a set of 1 and 0.

Figure 4:
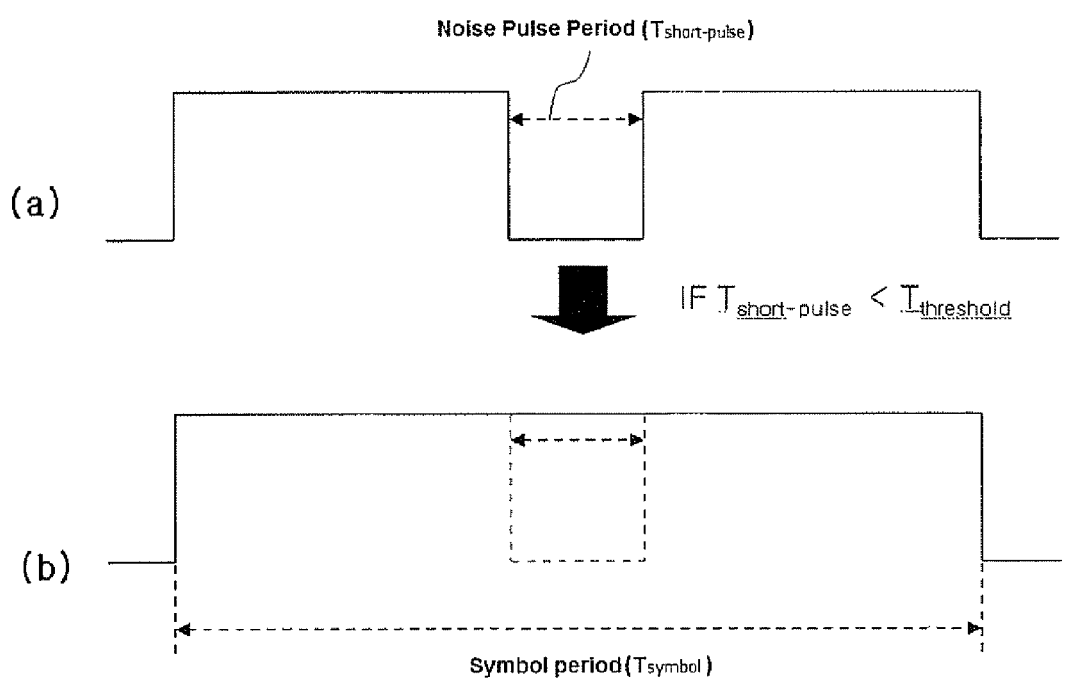
FIG. 4 is a view illustrating a signal from which the noise is removed according to the embodiment of the present invention.

The noise eliminator 302 functions to eliminate the noise included in an output of the limiter 301. A sign of an signal input to the limiter 301 may be changed according to ambient environment. In this case, the limiter 301 outputs an inverse signal of an intended signal. Such an example is shown in FIG. 4. FIG. 4 is a view illustrating a signal with noise and a signal from which the noise is removed according to the embodiment of the present invention. FIG. 4(a) indicates an output signal of the limiter 301 including the noise. The noise eliminator 302 regards a certain pulse of a signal as the noise, and eliminates it when a width of the certain pulse thereof is less than a predetermined value of a symbol period. FIG. 4(b) shows a signal from which the noise is removed.

Figure 5:
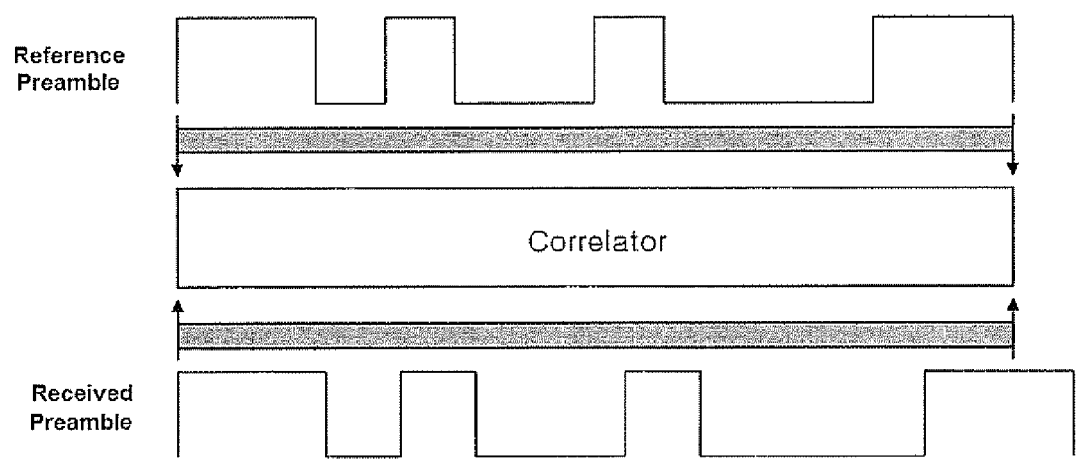
FIG. 5 is a view illustrating a reference preamble signal and a received preamble signal.

The preamble detector 303 detects whether the signal input to the decoding unit 107 is a reference preamble signal. Hereinafter, the following is an explanation of a method of detecting the preamble signal using the preamble detector 303. FIG. 5 is a view illustrating the reference preamble signal and a received preamble signal. The preamble detector 303 receives a signal, and checks whether received signals until a specific time are identical with the reference preamble signal. In an embodiment of a checking method as to whether one of the received signals is identical with the reference signal, it is checked that a preamble signal is received when a correlation value between the received signals until the specific time and the reference preamble signal exceeds a set threshold value.

The preamble detector 303 transmits a detection result to the data detector 304 and the data rate estimator 305 when the preamble signal is detected.

Upon reception of a signal indicating that the preamble signal is received from the preamble detector 303, the data rate estimator 305 estimates a data rate of the received signal based on the received preamble signal. FIG. 6 is a timing chart illustrating a method of estimating a data rate of a signal received by the data rate estimator 305 according to the embodiment of the present invention.

Figure 6A:
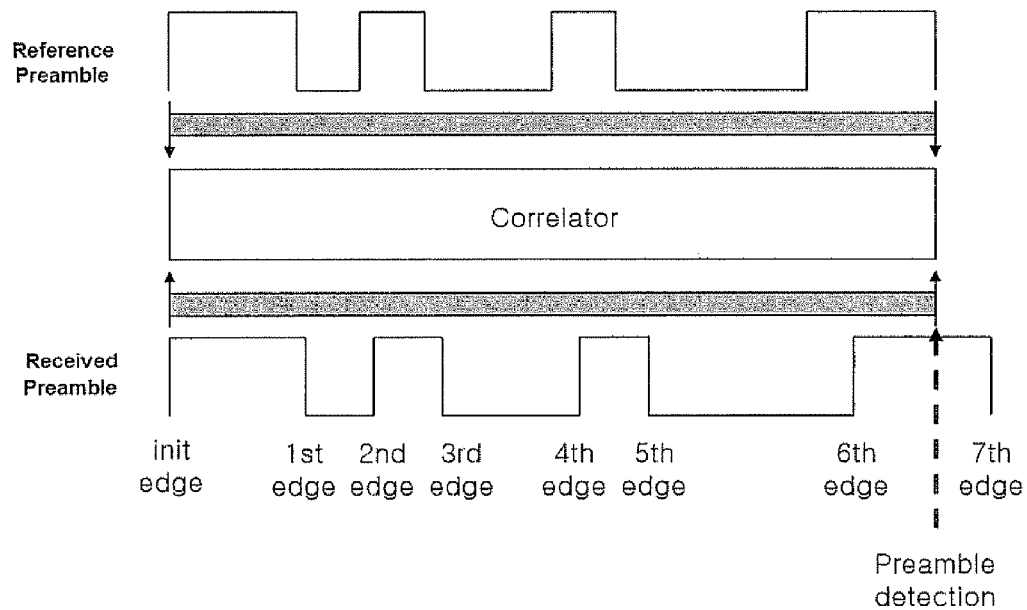
FIG. 6 is a timing chart illustrating a method of estimating a data rate of a signal received by a data rate estimator 305 according to the embodiment of the present invention.

FIG. 6(a) shows a case where the data rate of the received signal is slower than expected. FIG. 6(a) shows a case where the data rate of the received signal is faster than expected. As shown in FIG. 6, a preamble signal may have seven edges after an initial edge. Such a preamble signal is illustrated as an example. The preamble signal may have any predetermined form.

When the preamble detector 303 generates a preamble detection signal, it recognizes the number of edges included in the preamble signals received until a time corresponding to a seventh edge of the reference preamble signal. When the number of the edges is less than seven, it is judged that a data rate is slower than expected. When the number of the edges is greater than seven, it is judged that the data rate is faster than expected. The data rate of the received signal is estimated based on a time difference or the number of samples between a seventh edge of the reference preamble signal and a seventh edge of the received preamble signal.

Figure 7:
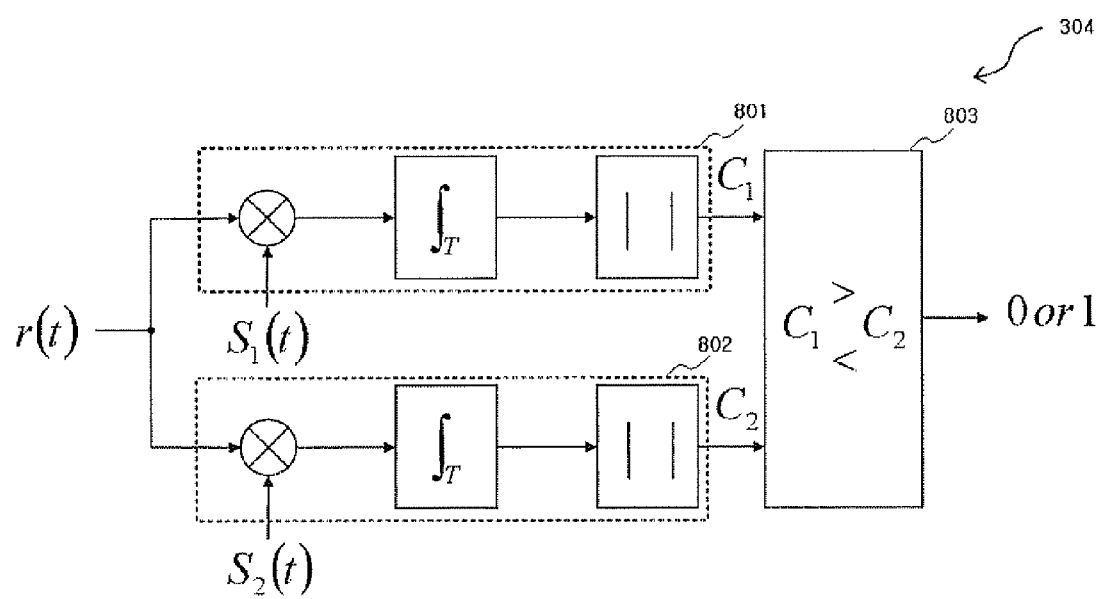
FIG. 7 is a view illustrating a configuration of a data detector 304 according to the embodiment of the present invention.

FIG. 7 is a view illustrating a configuration of a data detector 340 according to the embodiment of the present invention. The data detector 304 includes a first correlator 801, a second correlator 802, and a bit data determining part 803. The first correlator 801 performs correlation between the received signal r(t) and a first reference signal $S_1(t)$. The second correlator 802 performs correlation between the received signal r(t) and a second reference signal $S_2(t)$. The bit data determining part 803 determines bit data of 0 or 1 using the correlation results of the first and second correlators 801 and 802. The first correlator 801 outputs a signal proportional to a degree of similarity between a wave of the received signal and that of the first reference signal. The second correlator 802 outputs a signal proportional to a degree of similarity between a wave of the received signal and that of the second reference signal. In this case, the first correlator 801 multiplies the received signal by the first reference signal $S_1(t)$ and integrates the multiplied value during a symbol period, and outputs an absolute value $C_1$ of the integrated value. In the same manner, the second correlator 802 multiplies the received signal by the second reference signal $S_2(t)$ and integrates the multiplied value during a symbol period, and outputs an absolute value $C_2$ of the integrated value. The bit data determining part 803 compares the output $C_2$ of the second correlator 802 with the output $C_1$ of the first correlator 801, and outputs bit data of 0 or 1 according to the comparison result.

Figure 8:
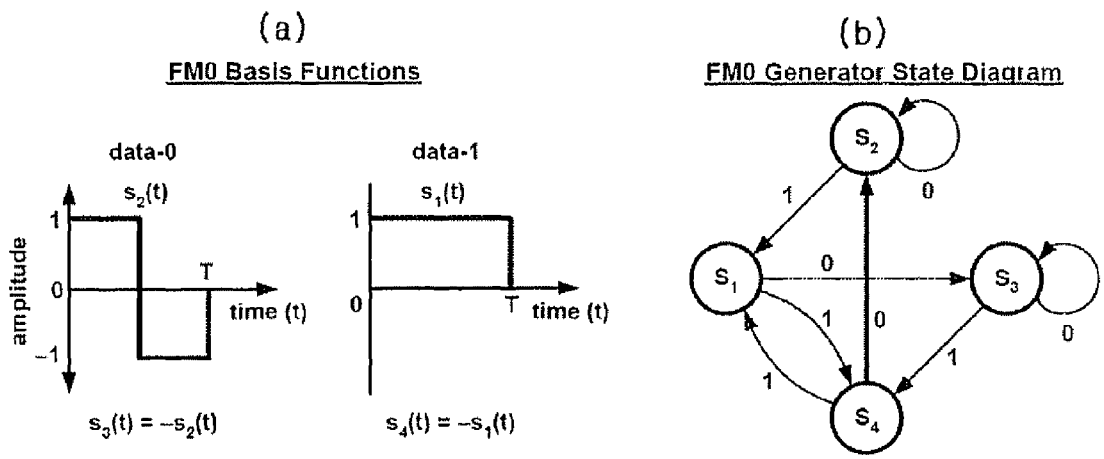
FIG. 8 is a view illustrating an example of a reference signal used in the data detector 304 according to the embodiment of the present invention.

FIG. 8 is a view illustrating an example of a reference signal used in the data detector 340 according to an embodiment of the present invention. The reference signal is a reference signal according to FM0 (frequency modulation 0) method of an EPC global generation 2 standard. However, the present invention is not limited thereto. FIG. 8(b) shows a state transition diagram of a symbol used in data-0 and data-1.

The bit determining part 803 performs correlation between the received signal and the first and second reference signals, wherein the width of the reference signals are adjusted according to a data rate of the signal received from the data rate estimator 305. As described above, by estimating the data rate of the received signal beforehand and performing a signal correlation using an exact reference signal of which the width are modified based on the estimated data rate, it is available to restore the data signal much more accurately. Accordingly, a signal correlation is performed using an exact reference signal to enable more exact restoration of a data signal.

Figure 9:
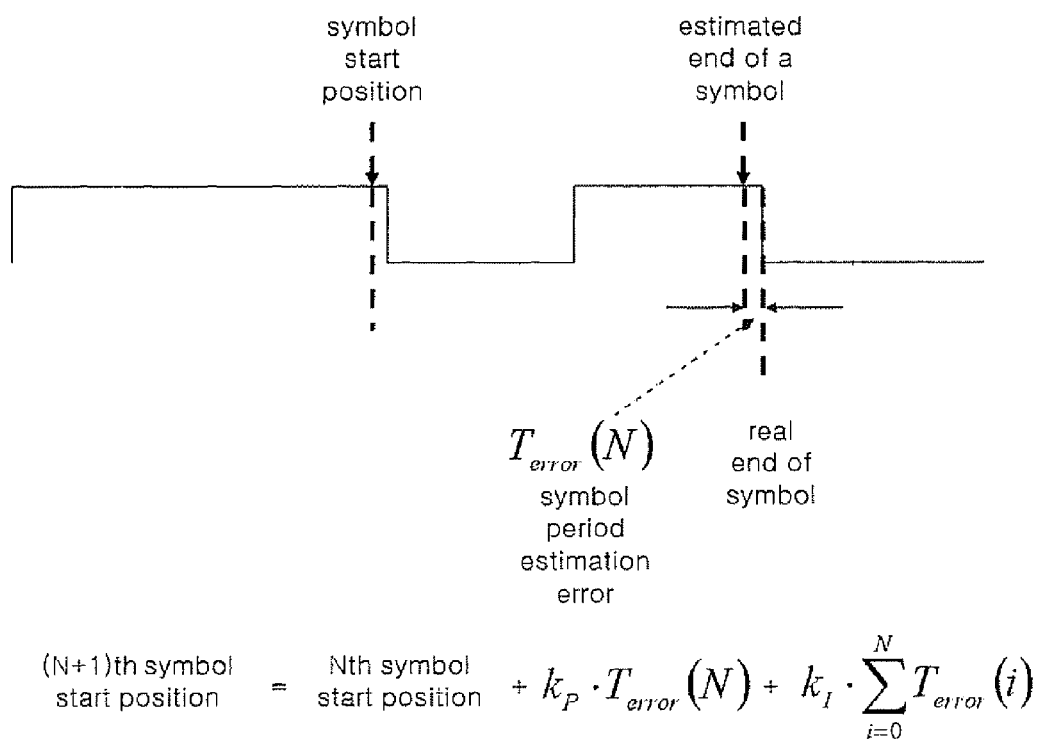
FIG. 9 is a view illustrating a method of correcting a data rate of a received signal according to the embodiment of the present invention.

The data rate correcting unit 306 according to the present invention is now described. FIG. 9 is a view illustrating a method of correcting a data rate of a received signal according to the embodiment of the present invention.

The data rate estimator 305 estimates a data rate using a preamble signal. The estimated data rate may be different from a real data rate due to the noise. This may cause errors in data detections. In order to prevent the occurrence of errors, the data rate correcting unit 306 detects a difference between a period of the received signal and that of the reference signal each time the data detector detects data one bit by one bit, and corrects the period of the reference signal corresponding to the detected difference between the periods thereof.

Referring to FIG. 9, the received signal is compared with the reference signal during one period, and the data rate is corrected proportional to the difference. So as to prevent an estimated value of the data rate from being unstably changed, a difference between a previously received signal and the reference signal is accumulated to be used in correction of the data rate.

Next, returning to FIG. 1, the data selecting unit 108 is described. As described earlier, a plurality of decoded output data from the plurality of decoding units 107 are provided to the data selecting unit 108, and the data selecting unit 108 selects one of the plurality of decoded output data. That is, the data selecting unit 108 selects one from a plurality of signal receiving paths.

The data selecting unit 108 may select data in such a way that it selects a signal having an exact CRC (cyclic redundancy checking) code among the decoded data. Further, the data selecting unit 208 may select data of the decoding unit 107 having the greatest signal correlation value between the reference preamble signal calculated by each preamble detector 303 and the received signal.

The RFID has been described as an example of a communication system, which may be applied to the present invention. In a case of a passive RFID system, a signal transmitted from a tag is substantially identical with a local frequency of a reader receiver. When a signal transmitted from the tag is a BPSK signal, data may be restored by only the in-phase channel signal. However, in a real environment, both of the in-phase channel signal and the quadrature-phase channel signal are received due to a change of phase. Accordingly, in order to restore exact data, after a phase of the received signal is converted to make the in-phase channel signal the greatest value, data are decoded. Since to what extent is the phase of the received signal converted is different according to situation, a phase is previously converted into various predetermined values, a signal having the in-phase channel signal of the greatest value is selected, and data are restored, with the result that the most exact data may be restored.

While exemplary embodiments of the present invention have been shown and described in this specification, it will be understood by those skilled in the art that they are illustrative of the invention and are not to be constructed as limiting the invention. Further, various modifications of the invention or an equivalent invention may be realized in light of a detailed description of the present invention. Accordingly, such modifications or equivalent invention without departing from the spirit and scope of the invention are intended to be included in a right of the invention.

What is claimed is:

1. A radio frequency signal receiver comprising:
    a phase converting unit converting a phase of a received digital signal to predetermined angles to produce a plurality of output signals having different phases;
    decoding units decoding the plurality of output signals from the phase converting unit, respectively; and
    a data selecting unit selecting and outputting one of the decoded output signals,
        wherein the decoding unit includes:
    a limiter outputting a binary signal according to a sign of a corresponding output signal of the phase converting unit;
    a preamble detector detecting whether the corresponding output signal of the phase converting unit is a preamble signal; and
    a data detector detecting data based on the binary signal in response to the detection result of the preamble detector.

2. The radio frequency signal receiver according to claim 1 further comprising:
    a radio frequency receiving unit receiving a radio frequency signal and down-converting a frequency of the radio frequency signal; and
    an analog-to-digital converting unit converting the frequency down-converted signal into a digital signal and providing the digital signal to the phase converting unit.

3. The radio frequency signal receiver according to claim 2, wherein the radio frequency receiving unit outputs an in-phase channel signal and a quadrature-phase channel signal, the analog-to-digital converting unit includes:
    a first ADC (analog-to-digital converter) converting the in-phase channel signal into a digital signal; and a second ADC converting the quadrature-phase channel signal into the digital signal.

4. The radio frequency signal receiver according to claim 1, wherein the received digital signal includes an in-phase channel signal and a quadrature-phase channel signal,
the phase converting unit produces the plurality of output signals having different phases using the in-phase channel signal and the quadrature-phase channel signal.

5. The radio frequency signal receiver according to claim 1, wherein the data detector includes:
first correlator performing correlation of the binary signal and a first reference signal, and second correlator performing correlation of the binary signal and a second reference signal; and
a bit data determining unit determining bit data based on the signal correlation results of the first and second correlators.

6. The radio frequency signal receiver according to claim 1, wherein the decoding unit further includes a noise eliminator eliminating a noise included in the binary signal, the noise eliminator eliminates a pulse of the binary signal when a width $T_{short-pulse}$ of the pulse is less than a predetermined threshold value.

7. The radio frequency signal receiver according to claim 1, wherein the decoding unit further includes a data rate estimator estimating a data rate of the received digital signal based on the preamble signal, and
the data detector detects the data based on the estimated data rate of the received digital signal.

8. The radio frequency signal receiver according to claim 7, wherein the decoding unit further includes a data rate correcting unit correcting the estimated data rate of the received digital signal.

9. The radio frequency signal receiver according to claim 1, wherein the data selecting unit selects a signal having a most exact cyclic redundancy checking (CRC) code among the decoded signals.

10. The radio frequency signal receiver according to claim 1, wherein the data selecting unit selects and outputs one among the decoded signals from the decoding unit according to the detection result of the preamble detector.

11. A method of receiving a radio frequency signal comprising:
converting a phase of a received digital signal to predetermined angles to produce a plurality of output signals having different phases;
decoding the plurality of output signals, respectively; and
selecting one of the decoded output signals,
wherein the decoding of the plurality of output signals includes:
producing a binary signal according to a sign of the output signal;
detecting whether the output signal is a preamble signal; and
detecting data from the binary signal in response to the detection result of the preamble detection.

12. The method according to claim 11, wherein the received digital signal includes an in-phase channel signal and a quadrature-phase channel signal,
producing the plurality of output signals produces the plurality of output signals having different phases using the in-phase channel signal and the quadrature-phase channel signal.

13. The method according to claim 11, wherein detecting the data includes:
performing correlation of the binary signal and a first reference signal, and correlation of the binary signal and a second reference signal, respectively; and
determining bit data based on the signal correlation results.

14. The method according to claim 11, wherein decoding the plurality of output signals includes eliminating a pulse of the binary signal when a width $T_{short-pulse}$ of the pulse is less than a predetermined threshold value.

15. The method according to claim 11, wherein decoding the plurality of output signals further includes estimating a data rate of the received digital signal based on the preamble signal, and
detecting the data includes detecting the data based on the estimated data rate of the received digital signal.

16. The method according to claim 15, wherein decoding the plurality of output signals further includes correcting the estimated data rate of the received digital signal.

17. The method according to claim 11, wherein selecting the one of the decoded output signals includes selecting a signal having a most exact cyclic redundancy checking (CRC) code among the decoded signals.

18. The method according to claim 11, wherein selecting the one of the decoded output signals includes selecting one among the decoded signals according to the detection result.

19. A non transitory computer readable recording medium for storing a computer program for executing the radio frequency signal receiving method described in any one of claims 11 to 18.

* * * * *